United States Patent [19]
Morita

[11] Patent Number: 5,675,190
[45] Date of Patent: Oct. 7, 1997

[54] OPERATING APPARATUS FOR PARKING BRAKE AND METHOD FOR RELEASING PARKING BRAKE

[75] Inventor: Haruyuki Morita, Ibaraki, Japan

[73] Assignee: Hitachi Construction Machinery Co., Ltd., Tokyo, Japan

[21] Appl. No.: 520,515

[22] Filed: Aug. 29, 1995

[30] Foreign Application Priority Data

Aug. 29, 1994 [JP] Japan .................. 6-203906

[51] Int. Cl.$^6$ .................................. B60R 25/08
[52] U.S. Cl. .............. 307/10.1; 303/3; 303/124; 364/426.01; 180/333; 180/287
[58] Field of Search .................... 307/9.1, 10.1, 307/10.2, 10.3, 10.4, 10.5, 10.6; 303/124, 3.89; 364/424.05, 426.01; 180/275, 276, 287, 333; 340/932.2, 450.1, 452, 453, 457.3, 479

[56] References Cited

U.S. PATENT DOCUMENTS

| | | | |
|---|---|---|---|
| Re. 32,474 | 8/1987 | Reid | 307/10.1 |
| 2,688,719 | 9/1954 | Busquet | 188/171 |
| 3,579,285 | 5/1971 | Verdier | 307/10.2 |
| 3,800,279 | 3/1974 | Thompson | 307/10.2 |
| 3,850,260 | 11/1974 | Obermeit | 307/10.2 |
| 3,910,372 | 10/1975 | Mozzar | 307/10.2 |
| 3,982,792 | 9/1976 | Nakajima | 303/13 |
| 3,985,210 | 10/1976 | Hodge et al. | 303/16 |
| 4,339,154 | 7/1982 | Duttarer et al. | 303/3 |
| 4,596,215 | 6/1986 | Palesotti | 180/333 |
| 4,812,671 | 3/1989 | Furrow | 307/10.1 |
| 5,086,868 | 2/1992 | Fontaine | 180/287 |
| 5,293,517 | 3/1994 | Andruet | 307/9.2 |

FOREIGN PATENT DOCUMENTS 239891  10/1990  Japan.
557141  8/1993  Japan.

Primary Examiner—William M. Shoop, Jr.
Assistant Examiner—Peter Ganjian
Attorney, Agent, or Firm—Cushman, Darby & Cushman IP Group of Pillsbury Madison & Sutro LLP

[57] ABSTRACT

An operating apparatus for a parking brake is provided with a parking brake switch and an engine key switch. The parking brake switch can be operated to an ON position, an OFF position and a RESET position. When the engine key switch is OFF, the parking brake maintains an engaged state regardless of the operating position of the parking brake switch. When the engine key switch is switched from OFF to ON, the parking brake is released only when the parking brake switch is first operated to the RESET position. Then, after the parking brake switch is operated to the RESET position, the parking brake is released when the parking brake switch is operated to the OFF position, but it is engaged if the parking brake switch is operated to the ON position. With this, the parking brake is released through one and the same operating procedure, regardless of the operating position of the parking brake switch.

19 Claims, 10 Drawing Sheets

OFF
(RELEASE)

OFF
(RELEASE)

ON
(ENGAGE)

ON
(ENGAGE)

OPERATING APPARATUS FOR PARKING BRAKE AND METHOD FOR RELEASING PARKING BRAKE

BACKGROUND OF THE INVENTION

1. Field of the Invention

The present invention relates to an operating apparatus for a parking brake which automatically engages the parking brake when the engine stops and a method for releasing a parking brake in which the parking brake is released with the operation of a parking brake switch. The present invention applies to heavy-duty vehicles such as wheel loaders, wheel excavators, dump trucks and the like.

2. Related Background Art

It is becoming increasingly common to employ the so-called negative method parking brakes, whereby the parking brake is automatically engaged when the engine is stopped, in heavy-duty vehicles such as wheel loaders and the like, in order to ensure safety and reliable braking power.

Operating apparatuses for the parking brake of this type in the prior art are disclosed in, for instance, (1) Japanese Examined Utility Model Publication No. Heisei 2-39891, (2) Japanese Examined Patent Publication No. Heisei 5-57141 and (3) U.S. PAT. NO. 3,985,210.

The intent of each of the apparatuses disclosed in these publications is to ensure that the vehicle will not run away due to the parking brake becoming released unexpectedly when the engine is restarted on a slope or the like. In order to achieve this object, each of these apparatuses prohibits the release of the parking brake until the parking brake switch is operated.

The apparatuses disclosed in publications (1) and (2) above, for instance, release the parking brake only when either of the operations described in (A) and (B) below is executed after the engine is started.

(A) If the parking brake switch is at the ON (engage) position: the parking brake switch is operated to the OFF (release) position.

(B) If the parking brake switch is at the OFF position: the parking brake switch is first operated to the ON position and then to the OFF position.

The apparatus disclosed in publication (3) above, on the other hand, causes the operating position of the parking brake switch to return to a neutral position by self-recovery when it is operated. Then, the parking brake is released when the parking brake switch is operated from the neutral position to the OFF position.

However, the apparatuses disclosed in publications (1) and (2) above have the following disadvantages i)–iii).

i) Since methods for releasing the parking brake are different depending upon whether the parking brake switch is at the ON position or the OFF position, it is difficult for the driver to understand how to release the parking brake and there is a likelihood that the driver misunderstands the methods for releasing the parking brake.

ii) In order to prevent misunderstanding on the part of the driver, a plate or the like with operating instructions must be provided near the parking brake switch, causing an increase in production costs. In addition, since it is necessary to secure enough space to provide the plate or the like, the installation location of the parking brake switch is restricted.

iii) In the case (B) described above, it is prohibited to release the parking brake until the parking brake switch is operated to the OFF position after it is first operated to the ON position. However, normally, in order to engage the parking brake, the parking brake switch is operated to the ON position and it may seem illogical and counter intuitive to perform this same operation in order to release the parking brake. Thus, operability is diminished.

With the apparatus disclosed in publication (3), since the operating position of the parking brake switch always returns to the neutral position by self-recovery, the driver cannot ascertain whether the parking brake is currently engaged or released by checking the operating position of the parking brake switch.

An indicator lamp or the like of the known art may be used in the apparatus such as disclosed in publication (3), which is lit when the parking brake is engaged. However, if the indicator lamp or the like does not light due to failure or the like, the driver will not be able to verify the operating state of the parking brake.

Moreover, in the apparatus such as disclosed in publication (3), in which the operating position of the parking brake switch always returns to the neutral position by self-recovery, it is often the case that a spring member is provided internally in the switch. However, when the spring member is provided internally in the switch, the switch may be switched to the ON position or the OFF position by touching lightly and unintentionally on the switch knob of the parking brake.

SUMMARY OF THE INVENTION

An object of the present invention is to provide an operating apparatus for a parking brake and a method for releasing the parking brake with which operability can be improved by ensuring that the parking brake can be released through one and the same operating procedure, regardless of the current operating position of the parking brake switch.

Another object of the present invention is to provide an operating apparatus for a parking brake with which the operating state of the parking brake can be ascertained by simply checking the current operating position of the parking brake switch visually.

Yet another object of the present invention is to provide an operating apparatus for a parking brake and a method for releasing the parking brake which ensure that the operating position of the parking brake switch is not unexpectedly switched except by intention of the operator.

In order to achieve the objects described above, the operating apparatus for a parking brake according to the present invention comprises an engine key switch, which is provided with an ON position at which an engine is started and an OFF position at which the engine is stopped, a parking brake switch, which is provided with an ON position for issuing a command for engaging the parking brake, an OFF position for issuing a command for releasing the parking brake, and a RESET position for forcibly releasing the parking brake, and a parking brake control circuit that engages the parking brake regardless of the current setting position of the parking brake switch when the engine key switch is at the OFF position, and, when the parking brake switch is first operated to the RESET position after the engine key switch has been switched from the OFF position to the ON position, that releases the parking brake regardless of whether the parking brake switch is at the ON position or the OFF position.

With the operating apparatus for the parking brake according to the present invention, since the parking brake cannot be released unless the parking brake switch is operated to the RESET position, regardless of whether its operating position is at ON or OFF when the engine key switch is switched from the OFF position to the ON position, the method for releasing the parking brake is unified, improving the operability.

Also, if the OFF position and the RESET position, which are setting positions for the parking brake switch, are provided adjacent to each other, the procedure for releasing the parking brake is simplified.

Likewise, if the order of the setting positions for the parking brake switch is arranged thus: the ON position, the OFF position and the RESET position, an improvement in operability of the parking brake switch is achieved.

Furthermore, since the parking brake switch is returned to the OFF position by self-recovery when it is operated to the RESET position and its position is maintained when it is operated to the OFF position or the ON position, the driver can ascertain whether or not the parking brake is currently engaged simply by checking the operating position of the parking brake switch visually.

DESCRIPTION OF THE PREFERRED EMBODIMENT

First Embodiment

The following is an explanation of the first embodiment according to the present invention in reference to FIGS. 1-5.

Figure 1:
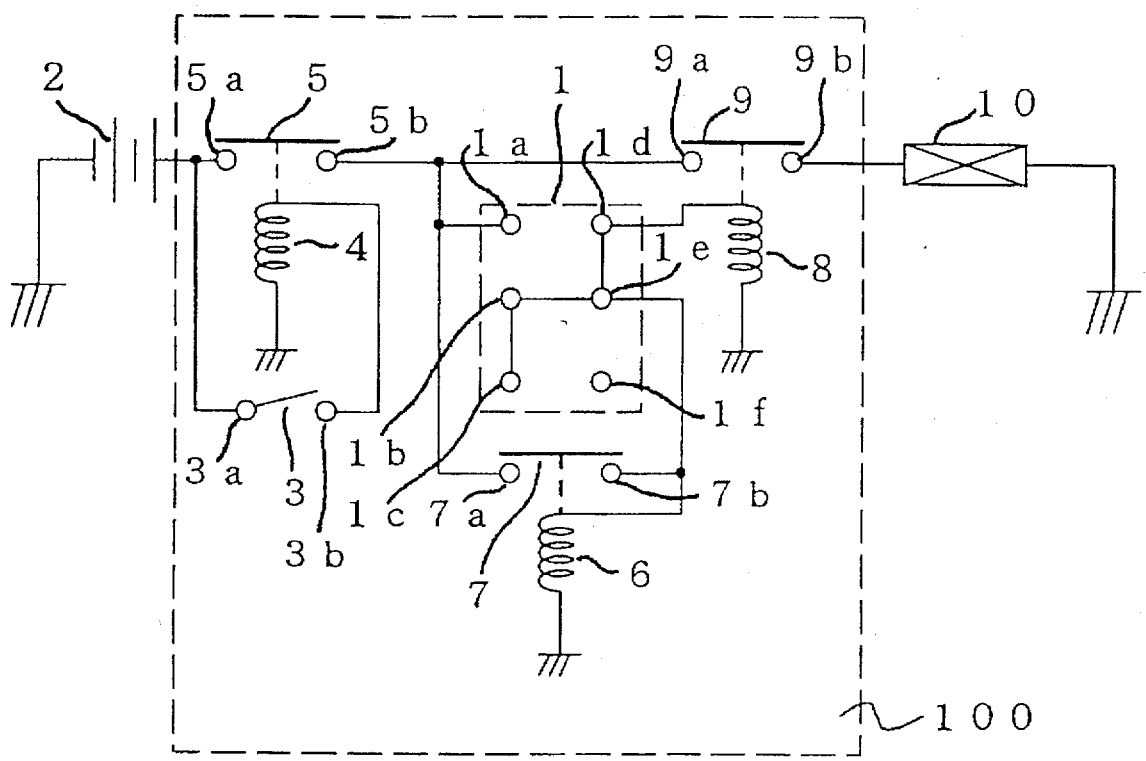
FIG. 1 is a circuit diagram of the first embodiment of an operating apparatus for a parking brake according to the present invention.
Figure 2:
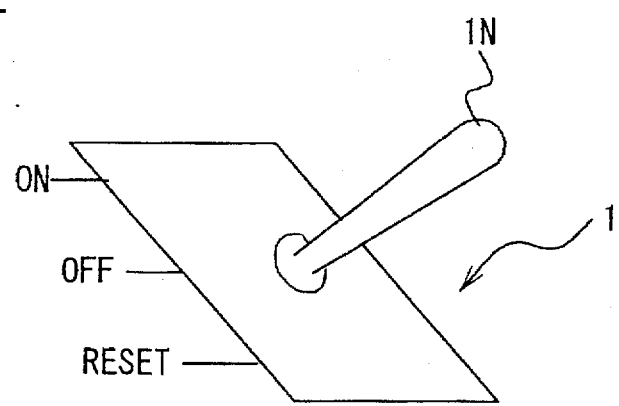
FIG. 2 is an external view of the parking brake switch.

FIG. 1 is a circuit diagram of the first embodiment of an operating apparatus for a parking brake according to the present invention and FIG. 2 is an external view of the parking brake switch which is used in this embodiment.

The parking brake switch 1 in this embodiment is provided with a switch knob 1N, as shown in FIG. 2, which is operated manually. This switch knob 1N can be operated to three operating positions, i.e., an ON (engage) position for issuing a command for engaging the parking brake, an OFF (release) position for issuing a command for releasing the parking brake, and a RESET (forced release) position for issuing a command for a forced release or a startup of the apparatus. When the parking brake switch 1 is operated to the RESET position, it returns to the OFF position by self-recovery automatically. When it is operated to the OFF position or the ON position, it maintains that position.

In FIG. 1, a power supply 2 is constituted by the battery or the like which is installed in the vehicle. An engine key switch 3 can be operated to an ON position at which the engine is started and an OFF position at which the engine is stopped. One end 3a of the engine key switch 3 is connected to the power supply 2 and the other end 3b is connected to a coil 4. When the engine key switch 3 is operated to the ON position, the engine begins startup, a voltage from the power supply 2 is supplied to the coil 4 and a relay 5 is closed to establish electrical contact between the contact points 5a and 5b.

The parking brake switch 1 is provided with contact points 1a-1f. The contact points 1a-1f are connected as described in (1)-(3) below depending upon the operating position of the parking brake switch 1. Note that there is always electrical contact between the contact points 1b and 1e.

(1) At the ON position: electrical contact is established between the contact points 1b and 1c and between the contact points 1e and 1f.

(2) At the OFF position: electrical contact is established between the contact points 1b and 1c and between the contact points 1d and 1e.

(3) At the RESET position: electrical contact is established between the contact points 1a and 1b and between the contact points 1d and 1e.

Reference number 6 indicates a coil for a relay 7 and when the electric current runs through the coil 6, the relay 7 is closed to establish electrical contact between contact points 7a and 7b. Note that an electric current starts flowing through the coil 6 when the parking brake switch 1 is operated to the RESET position and the relay 5 is closed.

Reference number 8 indicates a coil for a relay 9 and when the electric current runs through the coil 8, the relay 9 is closed to establish electrical contact between contact points 9a and 9b. Note that an electric current starts flowing through the coil 8 when the parking brake switch 1 is operated to the RESET position after the engine key switch 3 has been switched from the OFF position to the ON position.

Reference number 10 indicates a solenoid valve for the parking brake and when the electric current runs through the solenoid valve 10 for the parking brake, the parking brake (not shown) is released, and when the electric current stops flowing, the parking brake engages. The solenoid valve 10 for the parking brake comprises a solenoid and a valve (not shown) and when the electric current runs through the solenoid, it is excited, the valve opens and the oil is supplied from the hydraulic pressure source (not shown) to release the parking brake.

FIGS. 3-5 show how the individual relays shown in FIG. 1 operate in response to operations of the parking brake switch 1 and the engine key switch 3. The following is an explanation of the operation of this embodiment in reference to these figures. Note that the paths that are electrically connected with the power supply 2 are indicated with the thick lines in FIGS. 3-5.

Figure 3A:
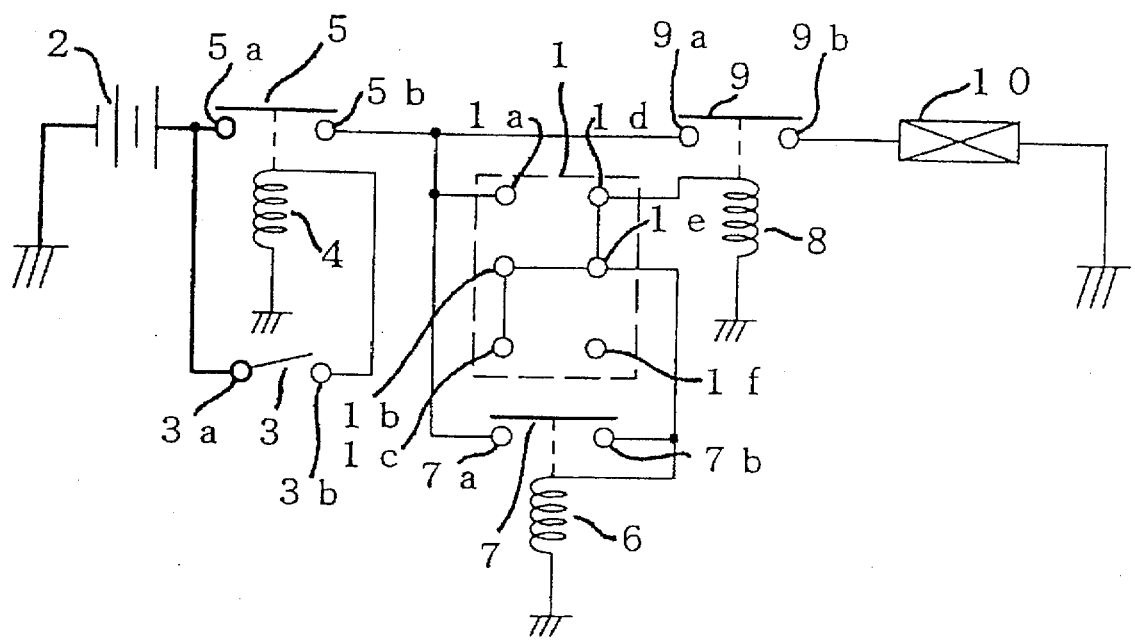
FIGS. 3A-3D illustrates the operation in FIG. 1.
Figure 3B:
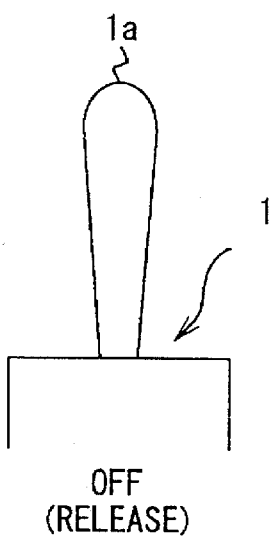

The engine is stopped when the engine key switch 3 is at the OFF position. In this state, there is no electrical contact between the contact points 3a and 3b, or between the contact points 5a and 5b of the relay 5. Consequently, no electric current runs on the downstream side of the contact point 5b and the parking brake maintains the engaged state. FIG. 3A shows the state in which the engine key switch 3 is at the OFF position and the parking brake switch 1 has been operated to the OFF position.

Figure 3C:
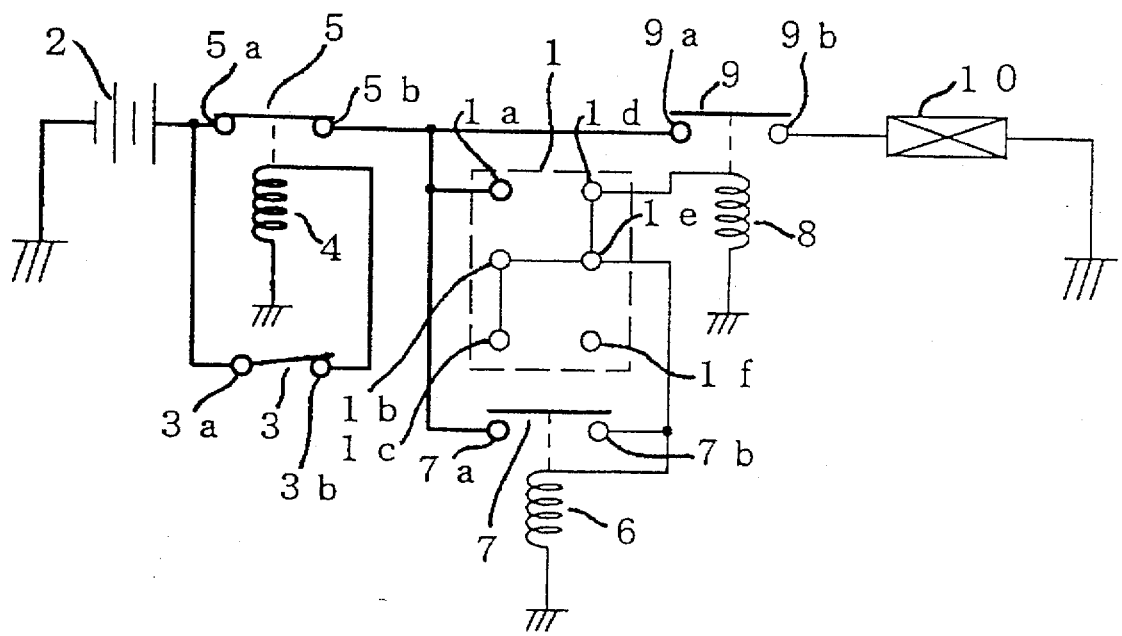
Figure 3D:
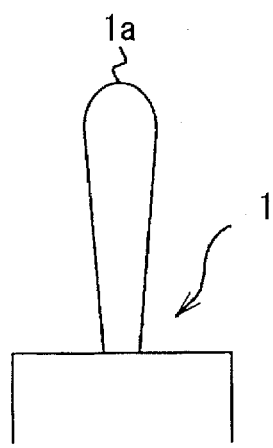

When the engine key switch 3 is operated to the ON position in this state, the coil 4 is excited with the electric current running through it as shown in FIG. 3C and the relay 5 is closed, to complete the connection between the contact points 5a and 5b. However, since the parking brake switch 1 is at the OFF position at this point, the relay 7 and the relay 9 remain in the opened state. As a result, the parking brake maintains the engaged state. In this case, as indicated with the thick lines in FIG. 3C, the contact point 1a of the parking brake switch 1, the contact point 7a of the relay 7 and the contact point 9a of the relay 9 are electrically connected with the power supply 2.

Figure 4A:
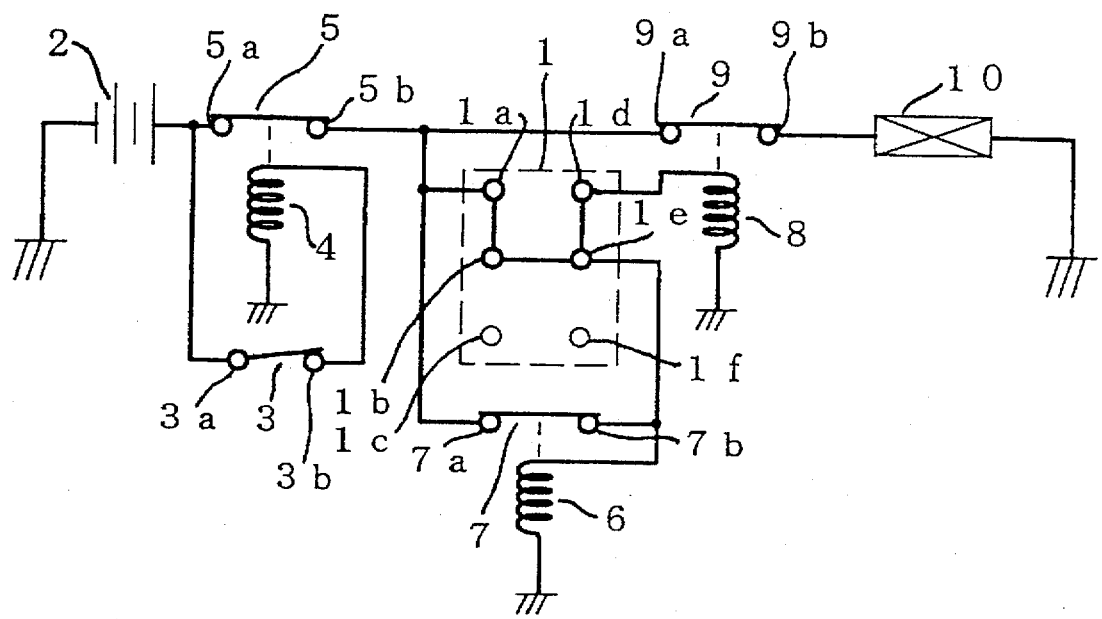
FIGS. 4A-4D are explanatory views continued from FIGS. 3A-3D.
Figure 4B:
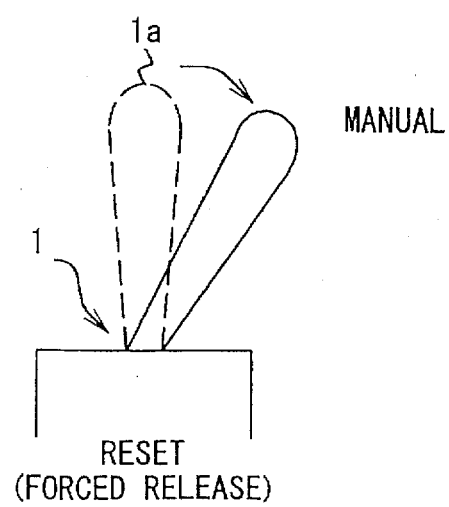

Next, when the parking brake switch 1 is operated to the RESET position, as shown in FIG. 4B, the contact points 1b and 1c are electrically disconnected from each other and electrical contact is established between the contact points 1a and 1b, as shown in FIG. 4A. With electrical contact established between the contact points 1a and 1b, an electric current runs through the coil 6 to excite the coil 6 and the relay 7 is closed, to establish electrical contact between the contact points 7a and 7b. Also, as electrical contact is established among the contact points 1a, 1b, 1e and 1d, the electric current runs through the coil 8 to excite the coil 8 and the relay 9 is closed, to establish electrical contact between the contact points 9a and 9b. With electrical connection between the contact point 5a and 5b and between the contact points 9a and 9b, the electric current runs through the solenoid valve 10 for the parking brake to release the parking brake.

Figure 4C:
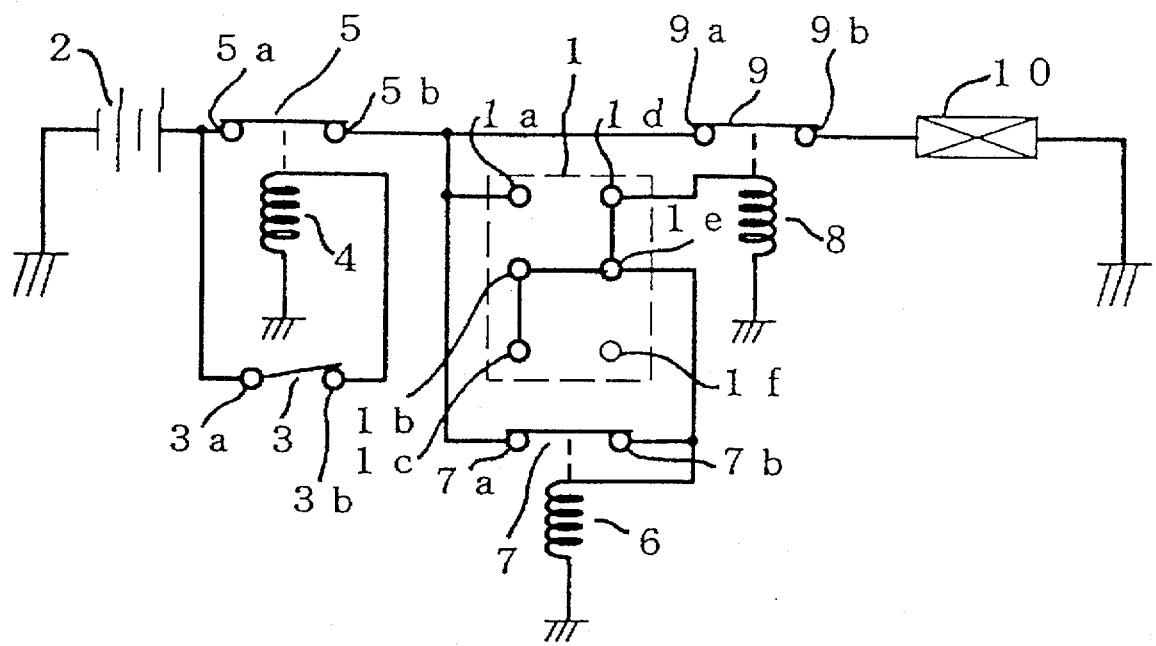
Figure 4D:
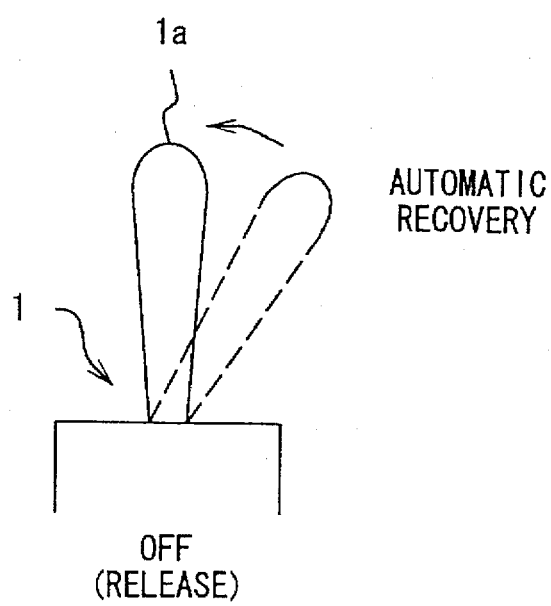

As described earlier, since the parking brake switch automatically returns to the OFF position by self-recovery, as shown in FIG. 4D, when the driver takes his hand off the parking brake switch 1 after operating it to the RESET position, the contact points 1a and 1b are electrically disconnected from each other and electrical contact is established between the contact points 1b and 1c, as shown in FIG. 4C. However, since the relay 7 maintains the closed state even when the contact points 1a and 1b are electrically disconnected from each other, the current runs through both the coil 6 and the coil 8 and, consequently, the electric current runs also through the solenoid valve 10 for the parking brake so that the parking brake maintains the released state.

As described above, when the parking brake switch 1 is at the OFF position with the relay 7 closed, the parking brake is released. Also, once the relay 7 is closed, it maintains the closed state until the engine key switch 3 is operated to the OFF position. As a result, the parking brake can be released by operating the parking brake switch 1 to the OFF position once it is operated to the RESET position.

Figure 5A:
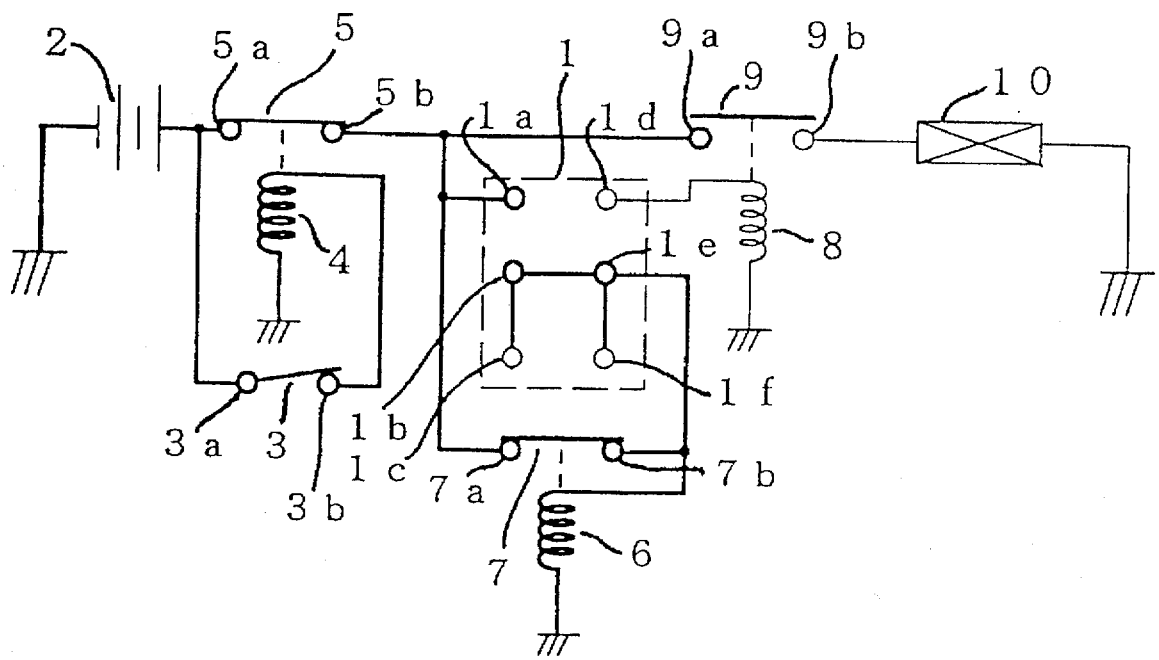
FIGS. 5A-5F are explanatory views continued from FIGS. 4A-4D.
Figure 5B:
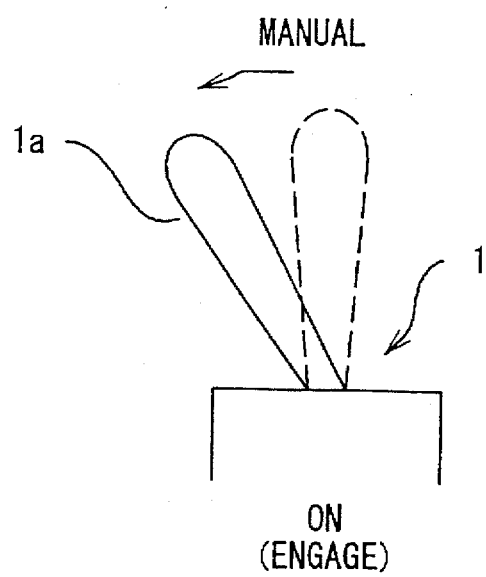

In the state shown in FIG. 4C, if the parking brake switch 1 is operated to the ON position as shown in FIG. 5B, the contact points 1d and 1e are electrically disconnected from each other and the contact points 1e and 1f are electrically connected to each other, as shown in FIG. 5A. This means that no electric current runs through the coil 8 and the relay 9 is opened, to electrically disconnect the contact points 9a and 9b from each other. As a result, no electric current runs through the solenoid 10 for the parking brake to engage the parking brake.

Figure 5C:
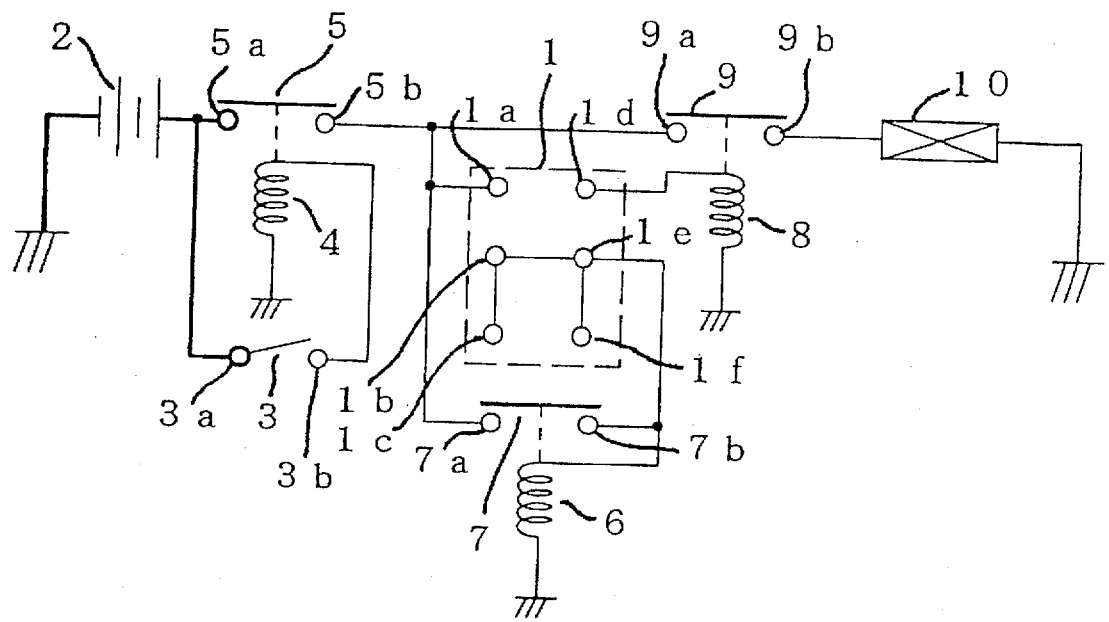
Figure 5D:
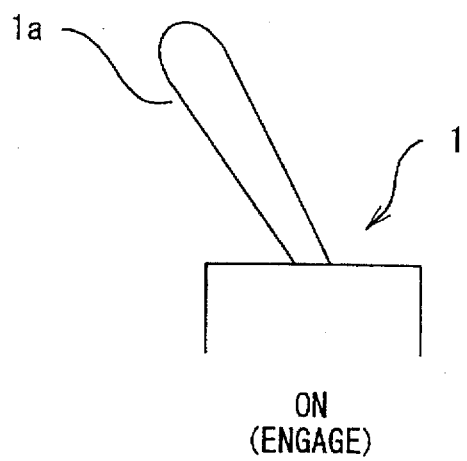

When the engine key switch 3 is operated to the OFF position, as shown in FIG. 5C, in the state shown in FIG. 5D (the parking brake switch 1 is at the ON position), the relay 5 is opened, to electrically disconnect the contact points 5a and 5b from each other so that no electric current runs on the downstream side of the contact point 5b.

Figure 5E:
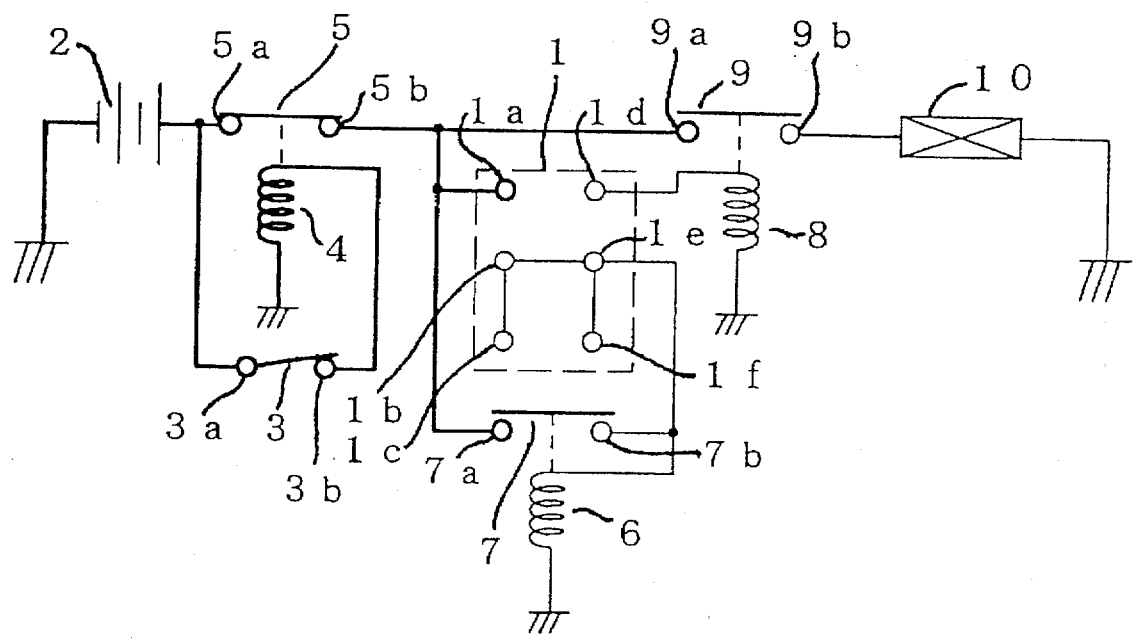
Figure 5F:
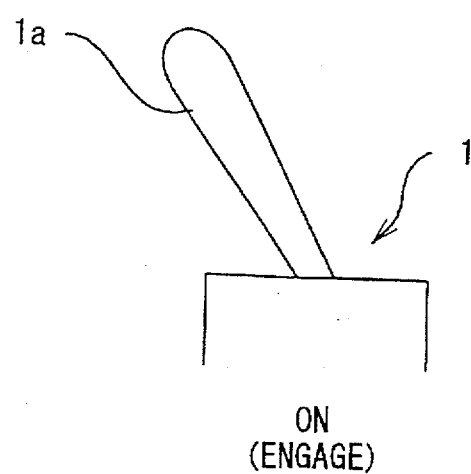

When the engine key switch 3 is operated to the ON position again, as shown in FIG. 5E, in this state, the relay 5 is closed, to establish electrical contact between the contact points 5a and 5b. However, since the parking brake switch 1 is at the ON position at this point, the relay 7 and the relay 9 are both open, no electric current runs through the solenoid valve 10 for the parking brake, and the parking brake maintains the engaged state. In order to release the parking brake in this state, the parking brake switch 1 must first be operated to the RESET position as shown in FIG. 4B.

The operation shown in FIGS. 3–5 can be summarized as follows. Since the relay 5 is open when the engine key switch 3 is at the OFF position, the parking brake maintains the engaged state regardless of the state of the parking brake switch 1. In addition, since the relays 7 and 9 maintain the open state if the parking brake switch 1 is either at the ON position or the OFF position when the engine key switch 3 has been switched from the OFF position to the ON position, the parking brake maintains the engaged state.

If, on the other hand, once the parking brake switch 1 is operated to the RESET position after the engine key switch 3 has been switched from the OFF position to the ON position, both the relays 7 and 9 are closed and the electric current runs through the solenoid valve 10 for the parking brake to be released. Once the relay 7 is closed, it maintains the closed state until the engine key switch 3 is operated to the OFF position. Consequently, after the parking brake switch 1 is operated to the RESET position, the parking brake is released by operating the parking brake switch 1 to the OFF position.

As described above, in the first embodiment, three operating positions, i.e., the ON position, the OFF position and the RESET position are provided for the parking brake switch 1, and when the parking brake switch 1 is at either the ON position or the OFF position, operating the parking brake switch 1 to the RESET position is used as a requirement for releasing the parking brake. Because of this, the method for releasing the parking brake is simplified and operability is improved.

In other words, since it is not necessary to perform counter-intuitive switching operation to release the parking brake, as in the case of the apparatuses disclosed in the publications described earlier, the erroneous operation by the operator can be prevented. As a result, it is not necessary to provide the plate or the like with operating instructions near the parking brake switch 1 and it would be sufficient to simply indicate "ON", "OFF" and "RESET" or the like beside the operating positions of the switch knob 1N.

In addition, in the first embodiment, after once operating the parking brake switch 1 to the RESET position, the operator can ascertain whether the parking brake is currently engaged or released simply by checking the operating position of the parking brake switch 1 visually.

Furthermore, since, when the parking brake switch 1 is operated to either the ON position or the OFF position, it is maintained at that position through a so-called detente holding, there is no risk of the erroneous operation, even if the operator inadvertently touches the switch knob 1N.

Second Embodiment

In the second embodiment, the process of engaging and releasing the parking brake is executed through software processing performed by a CPU.

Figure 6:
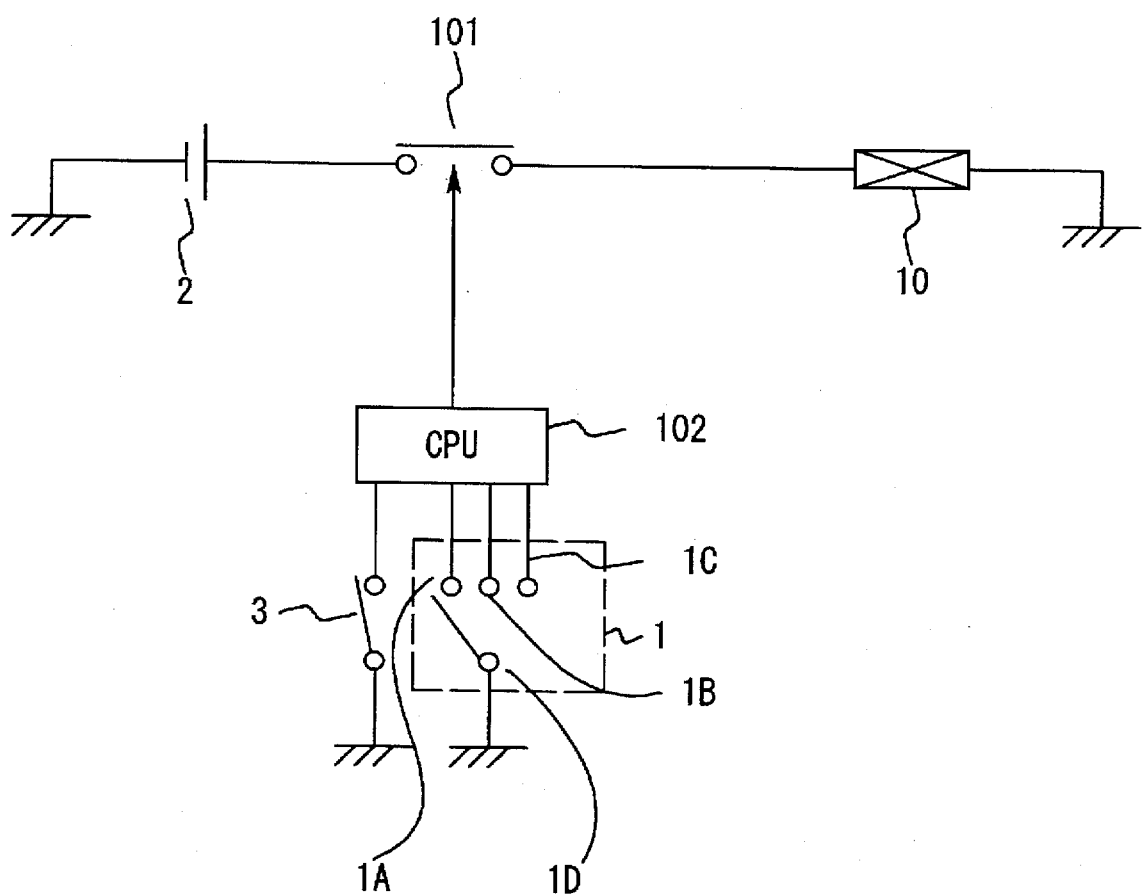
FIG. 6 is a circuit diagram of the second embodiment of an operating apparatus for a parking brake according to the present invention.

FIG. 6 is a block diagram of the second embodiment of the operating apparatus for the parking brake according to the present invention. In FIG. 6, the same reference numbers are assigned to the components that are common with the operating apparatus shown in FIG. 1, and the explanation here is mainly in regard to the differences.

In FIG. 6, reference number 101 indicates a relay that switches between closed and opened at a command issued by the CPU 102. When this relay 101 is closed, the power supply 2 and the solenoid valve 10 for the parking brake are electrically connected to operate the parking brake in the released state. If, on the other hand, the relay 101 is opened, the power supply 2 and the solenoid valve 10 for the parking brake are electrically disconnected from each other to operate the parking brake in the engaged state.

The parking brake switch 1 and the engine key switch 3 are connected to the CPU 102. The parking brake switch 1 in the second embodiment is provided with contact points 1A, 1B, 1C and 1D. When the parking brake switch 1 is operated to the ON position, electrical contact is established between the contact points 1A and 1D, when it is operated to the OFF position, electrical contact is established between the contact points 1B and 1D and when it is operated to the RESET position, electrical contact is established between the contact points 1C and 1D.

Figure 7:
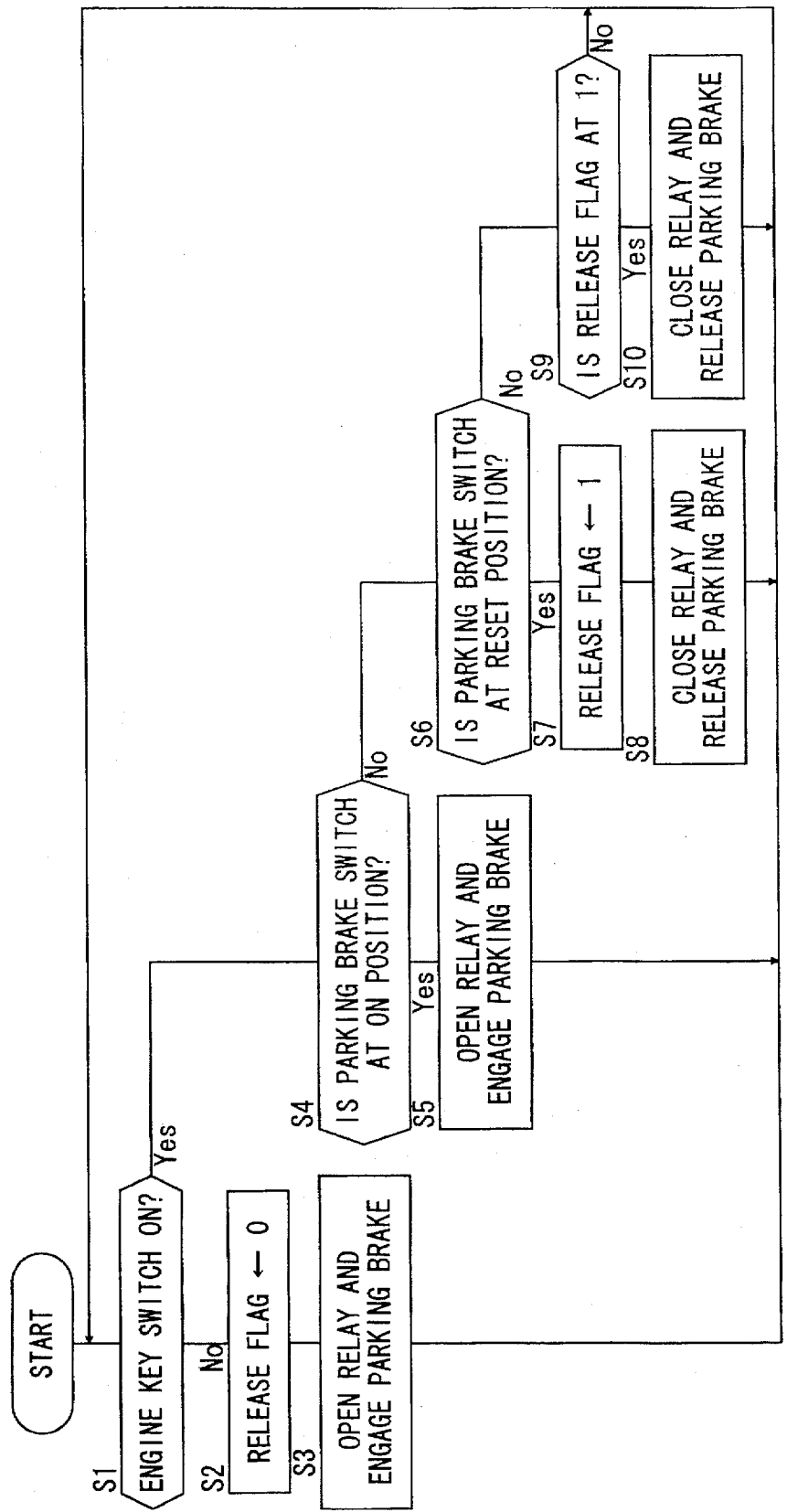
FIG. 7 is a flow chart illustrating the operation of the CPU shown in FIG. 6.

FIG. 7 is a flow chart illustrating the operation performed by the CPU 102 in the second embodiment and the operation of the second embodiment is explained in reference to this flow chart.

In step S1, in FIG. 7, the CPU 102 makes a decision as to whether or not the engine key switch 3 is at the ON position. If the decision is negative, the operation proceeds to step S2 in which the CPU 102 sets the release flag to "0" as an initial setting. This release flag makes it possible to recognize whether or not the parking brake switch 1 has been operated to the RESET position after the engine key switch 3 has been switched from the OFF position to the ON position. When the parking brake switch 1 has been operated to the RESET position, this flag is set to "1".

In step S3, the CPU 102 opens the relay 101. With this, the power supply 2 and the parking brake switch 1 are connected to each other electrically and the parking brake is engaged.

If, on the other hand, the decision made in step S1 is affirmative, the operation proceeds to step S4, in which a decision is made as to whether or not the parking brake switch 1 is at the ON position. If an affirmative decision is made, the operation proceeds to step S5, in which the CPU 102 opens the relay 101 to engage the parking brake.

If a negative decision is made in step S4, the operation proceeds to step S6, in which the CPU 102 makes a decision as to whether or not the parking brake switch 1 is at the RESET position. If the decision is affirmative, the operation proceeds to step S7, in which the CPU 102 sets the release flag to "1". Then in step S8, the CPU 102 closes the relay 101 to release the parking brake.

If a negative decision is made in step S6, the operation proceeds to step S9, in which the CPU 102 makes a decision as to whether or not the release flag is operated to "1". If the decision is negative, the operation returns to step S1, while if the decision is affirmative, the operation proceeds to step S10. In step S10, the CPU closes the relay 101 to release the parking brake.

When the processing in steps S3, S5, S8 and S10 has been completed, the operation returns to step S1.

In this manner, in the second embodiment, the CPU 102 monitors the operating positions of the parking brake switch 1 and the engine key switch 3, and switches the parking brake between engaged and released through the software processing performed by the CPU 102. Consequently, the circuit structure of the entire operating apparatus for the parking brake is simplified, achieving reductions in the production cost and power consumption.

Note that, while, in the flow chart in FIG. 7, the setting positions of the parking brake switch 1 are detected in the order of: the ON position→the RESET position→the OFF position, the order of detection is not limited to that in this embodiment.

While, in the embodiments described so far, the parking brake is released when the parking brake switch 1 is operated to the RESET position after the engine key switch 3 has been operated to the ON position, the parking brake may be released when the parking brake switch 1 is operated to the OFF position after it has been operated to the RESET position. In other words, the operation to the OFF position may be validated by operating the parking brake switch 1 to the RESET position and then the parking brake may be released by operating it to the OFF position.

The circuit structures shown in FIGS. 1 and 6 and various parts used in the circuits are not limited to those in the embodiments. Moreover, the structure of the parking brake is not limited to that employed in these embodiments.

I claim:

1. An operating apparatus for a parking brake comprising:
    an engine key switch provided with an ON position that starts an engine and an OFF position that stops said engine;
    a parking brake switch provided with a plurality of setting positions including an ON position that issues a command for engaging said parking brake, an OFF position that issues a command for releasing said parking brake and a RESET position that forcibly releases said parking brake;
    a parking brake drive device that engages and releases said parking brake; and
    a parking brake control circuit, into which signals respectively interlocking with operations of said engine key switch and said parking brake switch are inputted, said parking brake control circuit controlling said parking brake device so as to engage said parking brake regardless of which one of said plurality of setting positions said parking brake switch is set when said engine key switch is at said OFF position, and to release said parking brake regardless of whether said parking brake switch is at said ON position or said OFF position when said parking brake switch is operated to said RESET position after said engine key switch has been switched from said OFF position to said ON position.

2. The operating apparatus for said parking brake according to claim 1 wherein:
    among said plurality of setting positions provided for said parking brake switch, said OFF position and said RESET position are provided adjacent to each other.

3. The operating apparatus for said parking brake according to claim 1 wherein:
    said plurality of setting positions of said parking brake switch are arranged in an order of: said ON position, said OFF position and said RESET position.

4. The operating apparatus for said parking brake according to claim 1 wherein:
    said parking brake switch holds a set position when said parking brake switch is set at said ON position or said OFF position, and performs self-recovery to said OFF position when set at said RESET position.

5. The operating apparatus for said parking brake according to claim 1, wherein said parking brake control circuit includes a CPU.

6. The operating apparatus for said parking brake according to claim 1, wherein said parking brake drive device is a solenoid valve.

7. An operating apparatus for a parking brake comprising:
    an engine key switch provided with an ON position that starts an engine and an OFF position that stops said engine;

a parking brake switch provided with a plurality of setting positions including an ON position that issues a command for engaging said parking brake, an OFF position that issues a command for releasing said parking brake and a RESET position that validates said command for engaging said parking brake or said command for releasing said parking brake based upon an operation to said ON position or said OFF position, respectively;

a parking brake drive device that engages and releases said parking brake; and a parking brake control circuit, into which signals respectively interlocking with operations of said engine key switch and said parking brake switch are inputted, said parking brake control circuit controlling said parking brake drive device so as to engage said parking brake regardless of which one of said plurality of said setting positions said parking brake switch is set when said engine key switch is at said OFF position, and to allow said parking brake to be released regardless of whether said parking brake switch is at said ON position or said OFF position when said parking brake switch is first operated to said RESET position after said engine key switch has been switched from said OFF position to said ON position.

8. The operating apparatus for said parking brake according to claim 7 wherein:

among said plurality of setting positions provided for said parking brake switch, said OFF position and said RESET position are provided adjacent to each other.

9. The operating apparatus for said parking according to claim 7 wherein:

said plurality of setting positions of said parking brake switch are arranged in an order of: said ON position, said OFF position and said RESET position.

10. The operating apparatus for said parking brake according to claim 7 wherein:

said parking brake switch holds a set position when said parking brake switch is set at said ON position or said OFF position, and performs self-recovery to said OFF position when set at said RESET position.

11. The operating apparatus for said parking brake according to claim 7, wherein said parking brake control circuit includes a CPU.

12. The operating apparatus for said parking brake according to claim 7, wherein said parking brake drive device is a solenoid valve.

13. An operating apparatus for a parking brake comprising:

an engine key switch provided with an ON position that starts an engine and an OFF position that stops said engine;

a parking brake switch provided with an ON position that issues a command for engaging said parking brake, an OFF position that issues a command for releasing said parking brake, and a RESET position that forcibly releases said parking brake;

a first switching circuit that electrically connects or disconnects a power supply line with a power source by interlocking with ON/OFF operations of said engine key switch;

a second switching circuit that is connected to a downstream side of said first switching circuit and electrically connects or disconnects said power supply line by interlocking with said ON/OFF operations of said engine key switch and said parking brake switch;

a parking brake drive device that is connected to a downstream side of said second switching circuit and engages said parking brake when, at least one of said first switching circuit and said second switching circuit has disconnected said power supply line, and that releases said parking brake when said first switching circuit and said second switching circuit are electrically connected to said power supply line; and a parking brake control circuit that disconnects said first switching circuit regardless of said position of said parking brake switch when said engine key switch is at said OFF position, and prohibits electrical connection of said second switching circuit after said engine key switch has been switched from said OFF position to said ON position until said parking brake switch is first switched to said RESET position.

14. An operating apparatus for a parking brake comprising:

an engine key switch provided with an ON position that starts an engine and an OFF position that stops said engine;

a parking brake switch provided with an ON position that issues a command for engaging said parking brake, an OFF position that issues a command for releasing said parking brake, and a RESET position that forcibly releases said parking brake;

a switching circuit which electrically connects or disconnects a power supply line, to which a source voltage is supplied;

a parking brake drive device that is connected to said switching circuit and releases said parking brake with said source voltage supplied via said switching circuit; and a parking brake control circuit, into which signals respectively interlocking with operations of said engine key switch and said parking brake switch are inputted, said parking brake control circuit controls said switching circuit so as to be disconnected regardless of a setting position of said parking brake switch when said engine key switch is at said OFF position, and to prohibit electrical connection of said switching circuit after said engine key switch has been switched from said OFF position to said ON position until said parking brake switch is first switched to said RESET position.

15. A method for releasing a parking brake that automatically engages said parking brake when an engine key switch that switches an engine between an on state and an off state is at an OFF position, comprising steps of:

detecting that said engine key switch has been switched from said OFF position to an ON position;

detecting that said parking brake switch, which is provided with a RESET position that forcibly releases said parking brake, is operated to said RESET position; and controlling said parking brake so that release of said parking brake is allowed only after performing said step of detecting that said parking brake switch is operated to said RESET position after said step of detecting that said engine key switch has been switched from said OFF position to said ON position.

16. An operating apparatus for a parking brake comprising:

an engine key switch that switches an engine between an ON state and an OFF state, and outputs an engine ON signal corresponding to said ON state or an engine OFF signal corresponding to said OFF state;

a parking brake switch that is provided with an ON position that issues a command for engaging said parking brake, an OFF position that issues a command for releasing said parking brake and a RESET position that forcibly releases said parking brake, said parking brake switch outputting an ON position signal, an OFF position signal, or a RESET position signal corresponding to said ON position, said OFF position, or said RESET position, respectively;

a parking brake drive device that engages and releases said parking brake; and a parking brake control circuit into which said engine ON signal or said engine OFF signal and said ON position signal, said OFF position signal or said RESET position signal are inputted, said parking brake control circuit outputting to said parking brake drive device an engaging signal that engages said parking brake, regardless of inputting of any position signal from said parking brake switch, when said engine OFF signal is inputted, and outputs to said parking brake drive device a releasing signal that releases said parking brake, regardless of whether said ON position signal or said OFF position signal is inputted, only when said RESET position signal is once inputted after said engine OFF signal has been switched to said engine ON signal.

17. An operating apparatus for a parking brake comprising:

an engine key switch that switches an engine between an ON state and an OFF state, and outputs an engine ON signal corresponding to said ON state or an engine OFF signal corresponding to said OFF state;

a parking brake switch that is provided with an ON position that issues a command for engaging said parking brake, an OFF position that issues a command for releasing said parking brake and a RESET position that validates a command based upon an operation to said ON position or said OFF position, said parking brake switch outputs an ON position signal, an OFF position signal or a RESET position signal corresponding to said ON position, said OFF position, or said RESET position, respectively;

a parking brake drive device that engages and releases said parking brake; and a parking brake control circuit into which said engine ON signal or said engine OFF signal and said ON position signal, said OFF position signal or said RESET position signal are inputted, said parking brake control circuit outputs to said parking brake drive device an engaging signal that engages said parking brake, regardless of inputting of any position signal from said parking brake switch, when said engine OFF signal is inputted, and outputs to said parking brake drive device an allowing release signal that allows a release of said parking brake, regardless of whether said ON position signal or said OFF position signal is inputted, only when said RESET position signal is once inputted after said engine OFF signal has been switched to said engine ON signal.

18. An operating apparatus for a parking brake comprising:

an engine key switch that switches an engine between an ON state and an OFF state, and outputs an engine ON signal corresponding to said ON state or an engine OFF signal corresponding to said OFF state;

a parking brake switch that is provided with an ON position that issues a command for engaging said parking brake, an OFF position that issues a command for releasing said parking brake and a RESET position that forcibly releases said parking brake, said parking brake switch outputs an ON position signal, an OFF position signal, or a RESET position signal corresponding to said ON position, said OFF position, or said RESET position, respectively;

a parking brake drive device that engages and releases said parking brake; and a parking brake control circuit into which said engine ON signal or said engine OFF signal and said ON position signal, said OFF position signal or said RESET position signal are inputted, said parking brake control circuit outputs to said parking brake drive device an engaging signal that engages said parking brake, regardless of inputting of any position signal from said parking brake switch, when said engine OFF signal is inputted, and outputs to said parking brake drive device a releasing signal that releases said parking brake, only when said RESET position signal is once inputted after said engine OFF signal has been switched to said engine ON signal.

19. An operating apparatus for a parking brake comprising:

an engine key switch that switches an engine between an ON state and an OFF state, and outputs an engine ON signal corresponding to said ON state or an engine OFF signal corresponding to said OFF state;

a parking brake switch that is provided with an ON position that issues a command for engaging said parking brake, an OFF position that issues a command for releasing said parking brake and a RESET position that validates a command based upon an operation to said ON position or said OFF position, said parking brake switch outputs an ON position signal, an OFF position signal or a RESET position signal corresponding to said ON position, said OFF position, or said RESET position, respectively;

a parking brake drive device that engages and releases said parking brake; and a parking brake control circuit into which said engine ON signal or said engine OFF signal and said ON position signal, said OFF position signal or said RESET position signal are inputted, said parking brake control circuit outputs to said parking brake drive device an engaging signal that engages said parking brake, regardless of inputting of any position signal from said parking brake switch, when said engine OFF signal is inputted, and outputs to said parking brake drive device an allowing release signal that allows a release of said parking brake, only when said RESET position signal is once inputted after said engine OFF signal has been switched to said engine ON signal.

* * * * *